Jan. 28, 1969     D. W. YOUNG     3,424,001
FLOW METER
Filed Aug. 2, 1966
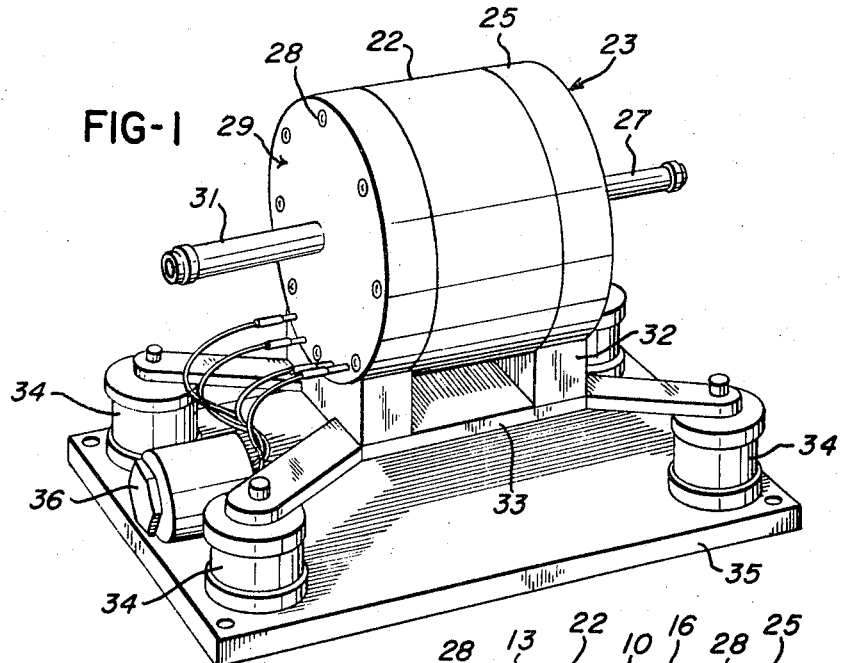
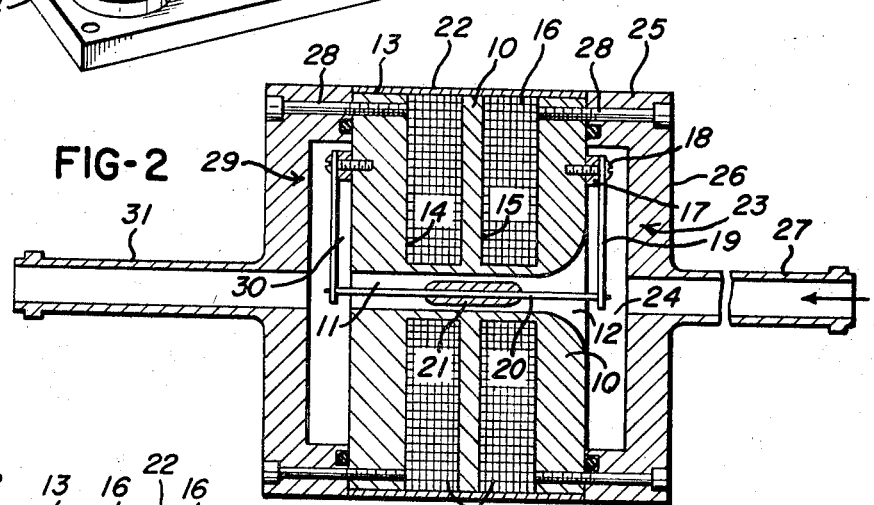
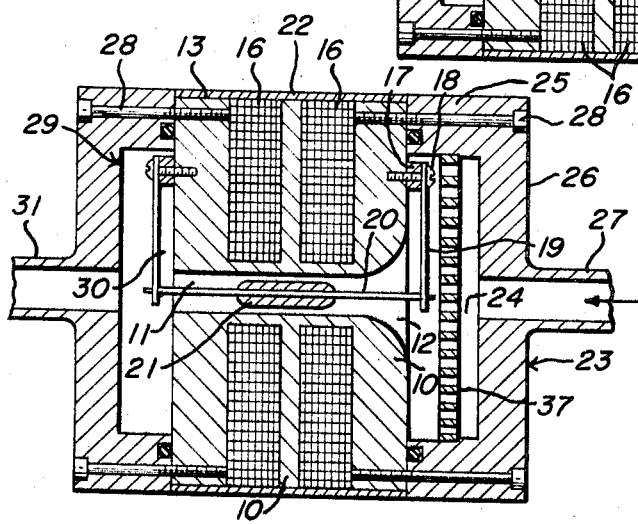
INVENTOR.
DON W. YOUNG
BY Jerome P. Bloom
ATTORNEY

United States Patent Office 3,424,001
Patented Jan. 28, 1969

3,424,001
FLOW METER
Don W. Young, 1601 Meriline Ave.,
Dayton, Ohio 45410
Filed Aug. 2, 1966, Ser. No. 570,145
U.S. Cl. 73—228      14 Claims
Int. Cl. G01f 1/06

ABSTRACT OF THE DISCLOSURE

A flow meter including means defining therein a flow passage, there being an aerodynamic drag means positioned in and arranged in a sense axially of the flow passage. The drag means is mounted by longitudinally spaced flexure elements, in an established position corresponding to zero flow, and the drag means is exposed per se to flow and has means in operative relation thereto which accurately transmits a signal corresponding to its movement which reflects the existing rate of flow through the passage.

---

This invention relates to a novel flow meter having an unusually wide range of operation and application. Embodiments are particularly distinguished by a high degree of accuracy in measuring very low rates of fluid flow.

Prior art flow meters occur in various structural forms. The great majority fall in three categories. One category includes units built to operate on the principle of measuring the pressure drop across an orifice. A second category utilizes a flow tube containing a rotating vane. The latter is subjected to mass flow and the rate of flow is measured thereby in correspondence with its speed of revolution. The third category includes a freely suspended float in a vertical tube which contains a flowing fluid, the rate of flow being determined in correspondence with the vertical movements of the float.

A common failing of all these forms of flow meters is their inability to measure, accurately, very low rates of fluid flow. A further drawback in the use of the prior art flow meters is the limited range in which they can function accurately. This has produced many problems in their use and application. For example, in surveying the cross-section of a hypersonic tunnel one must be able to measure the wide range of flow rates which respectively occur in the vicinity of its core, its boundary layers, and in the various areas therebetween. Due to the inadequacies of the flow meters above mentioned, it has been necessary in the past to use from three to five different flow meters for conducting this single survey. Even with this number of meters, moreover, the response thereof to low rates of flow has proven highly questionable. By contrast, the present invention produces flow meters a single one of which can accurately measure the complete range of flow which exists in a hypersonic tunnel and with a high degree of accuracy. There is thus provided a meter which is extremely accurate and one which is particularly economical when considering the range of its operation.

It is a primary object of the invention to provide a flow meter which is not only economical to fabricate but more efficient and satisfactory in use, adaptable to a wide range of application and unlikely to malfunction.

It is a further object of the invention to provide an improved flow meter capable of measuring, accurately, extremely low rates of fluid flow.

Another object of the invention is to provide a flow meter capable of measuring accurately very low rates of flow and having further an extremely wide range of effective operation.

An additional object of the invention is to provide a flow meter capable of measuring accurately flow rates as low as $8 \times 10^{-8}$ lbs. per sec. and as high as about $2.5 \times 10^{-4}$ lbs. per sec.

Another object of the invention is to provide a flow meter which operates on the principle of measuring the actual drag produced by a flowing fluid on a body mounted in a shaped pipe.

A further object of the invention is to provide a flow meter possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a generally perspective view of one embodiment of the flow meter as provided by the present invention, FIG. 2 is a cross-sectional view of the essential operating components of the flow meter of FIG. 1; and FIG. 3 shows a modification of the structure of FIG. 2.

Like parts are indicated by similar characters of reference throughout the several views.

The invention embodiment as here illustrated provides for a central, axially elongated body 10 of an annular form. In this instance the body 10 is preferably of an acrylic material and defines a generally cylindrical axially elongated, flow pasage 11. At its entrance end the passage 11 is moothly expanded to produce thereby a nozzle section 12. The body 10 is further characterized at its outer periphery 13 by a pair of circumferential cuts which define longitudinally spaced and relatively deep recesses 14 and 15.

This preferred embodiment contemplates a linear variable differential transformer. To this end each of the recesses 14 and 15 receives a primary and a secondary winding, the windings being designated by the numeral 16. The primaries of these windings are connected in series and their secondaries are arranged to oppose each other in a 180° out of phase relation, and are connected in series.

Referring to FIG. 2 of the drawings, as there seen, projected through a bushing 17 and fixed in each of the respective extremities of the body 10 is a screw 18. The screws 18 are coaxially aligned and each projects through and mounts in suspended relation thereto a flexure element 19. In this manner, the upper ends of the flexures 19 are respectively confined between the head of the screw 18 and the adjacent face of the bushing 17. So confined the flexures depend in spaced parallel relation to have their lowermost extremities positioned in line with and slightly outward from the respective ends of the flow passage 11.

Mounted to and bridging the lower ends of the flexure elements 19 is a shaft 20, preferably of stainless steel. As normally positioned by the fixures 19, the shaft 20 coincides with the longitudinal axis of the flow passage 11. The shaft 20 mounts an elongated, aerodynamically shaped, drag body 21, the ends of which are equidistantly spaced from the respectively adjacent support flexures 19. The drag body 21 is so positioned in the passage 11 as to immediately follow its nozzle section 12 and is so formed to position in a concentrically spaced relation to the passage walls.

In the example illustrated, the drag body 21 is preferably made of a magnetic iron and constitutes the magnetic core of the differential transformer above described.

It is noted the shaft 20 must in any case be nonmagnetic and preferably metallic. The latter enables its fabrication on a minimal diameter level. Moreover, one must avoid the shaft containing any material which could function to conduct magnetic lines of force from the drag body 21.

The shaft 20 has a mount of extreme simplicity, affording a very sensitive support for the drag body 21. There is, in its suspension, a complete absence of any jointed structures which might interfere with either a displacement of the shaft and the drag body 21, in response to a pressured flow of fluid through the flow passage 11, or the return thereof to their zero and originally established position in the flow passage.

As further seen in FIG. 2 of the drawings, the body 10 is peripherally capped by a sleeve 22. The body 10 also has an end cap 23 the inner surface portion of which is formed to define a generally cylindrical settling chamber 24 which immediately precedes the nozzle section 12 of the flow passage 11. The peripheral wall of the chamber 24 is defined by the axially projected flange 25 at the inner face of a cap-like end plate 26. The latter has a central opening in line with the flow passage 11, said opening being defined by a coaxially projected pipe section 27. The pipe 27 forms an inlet for the introduction of fluid to the settling chamber 24.

The cap 23 is secured in abutting relation to the one end of the body 10 by screws 28, the latter being projected through the flange 25 which is contained thereby to the one end of the sleeve 22. A similar cap 29 is similarly fixed in abutment with the opposite end of the body 10 and the sleeve 22 to define thereby at the exit to the flow passage 11 a communicating discharge chamber 30. Cap 28 also has a central opening which is coaxial with the flow passage 11, this opening being defined by a coaxial outwardly projected pipe section 31. It is to be noted that the chambers formed to the respective ends of the flow passages are of sufficient size to accommodate therein the respective ends of the shaft 20, their support flexures 19 and the elements in connection with the body 10 to which they mount.

In the example illustrated, the assembly above described mounts to a cradle 32 centered on a support plate 33. The support plate 33 has a generally rectangular form and each of its corners mounts on a shock fitting assembly 34, providing a mount thereof to the four corners of a base plate 35. Mounted to the base plate 35 is a receptacle 36. The latter serves as a means for connecting power to the primary wires for excitation of the described sensor unit. It also serves as a medium for transmitting from the described flow meter the output signals which correspond to the existing rate of movement of fluid through the flow passage 11, as will be further described. The particular wire connections are not described nor shown in any detail since, per se, they are well within the capabilities and understanding of a mechanic versed in the electrical arts.

Thus, the embodiment above described produces a sensor unit which is highly sensitive to flow rates of fluid flow. Of particular significance in this instance is the fact that the aerodynamically shaped drag body 21 constitutes the core of a linear variable differential transformer, the primary and secondary coils of which being constituted by the windings 16 as heretofore described. As should be obvious, once the unit is excited, any shift of the drag body 21 from its originally predetermined zero position produces a change in the reluctance of the transformer. This results in a voltage output which is a function of the velocity of the fluid flow producing the shift of the drag body.

More particularly, as the flow meter is inserted to measure a flow rate, the fluid the flow rate of which is to be measured enters the meter by way of the passage defined by the pipe section 27. Leaving the pipe 27, the fluid expands in the settling chamber 24, from which chamber it moves to the flow passage 11 by way of its convergent nozzle section 12. The settling chamber functions to eliminate any possible turbulence and the nozzle section 12 insures the uniformity of flow to and about the drag body 21. It may thus be seen that the flow meter utilizes a principal of fluid dynamics, the drag element or body 21 being exposed in a channel the entrance to which is defined by a nozzle form and the major extent of which is cylindrical. As a fluid flows through the small channel the drag body 21 constituting the electromagnetic core tends to be deflected proportionately to the mass flow per pound per second. In accordance with the shift or deflection of the drag body as produced by the axial force exerted by the fluid which flows about the drag body, the shaft 20 correspondingly applies its axially directed forces to the flexures 19. With the excitation of the unit an alternating current is put through the primary of the winding 16 which induces an alternating current in the secondary of the windings. The amplitude of the output from the secondary being dependent upon the reluctance of the magnetic circuit, as the movement of the drag body constituting the core of the transformer deflects with the flow of fluid, the reluctance of the transformer unit changes. Correspondingly the output from the secondary increases and the resulting signal so provided accurately identifies, in any one instance, the existing rate of flow.

In use of the invention flow meter as above described, there have been practical measurements by a single meter of pressure as low as about $8 \times 10^{-8}$ pounds per sec. and in a range up to as high as around $2.5 \times 10^{-4}$ pounds per sec. It may thus be seen that the flow meter of the invention, which is based on aerodynamic principles, is not only simple in structure and function but as an unusual sensing capability which functions accurately through an extremely wide range, including very low rates of flow.

As should be obvious, the simple but effective suspension of the shaft 20 insures not only a simplicity of meter structure but also that on termination of fluid flow through the passage 11, the core constituted by the drag body 21 will immediately return itself in a relatively precise manner to a zero position in the flow passage.

While the embodiment here illustrated, which is preferred, has a read out predicated on the wiring providing a variable reluctance type transformer, the embodiments need not be so limited. On the suspension of the aerodynamically shaped drag body 21 in a contoured tunnel-like passage by flexures and subjecting said drag body to a fluid flow, the signal of the fluid flow rate may be transmitted also through the flexures per se. In such instances, drag on or displacement of the flexures may furnish the required signal indicating the rate of flow.

Thus, the invention utilizes aerodynamic principles to produce, in a unique manner, a new and unusually advantageous flow meter.

FIG. 3 is the drawings illustrates the use in the settling chamber 24 of a honeycomb structure 34. The latter may be used to insure the transmission of the incoming fluid to the nozzle 12 in parallel lines of flow. This will eliminate incidental flow disturbances which may have a minor significance in the read out of the existing rate of flow.

The invention therefore achieves both a theoretical and practical advance in the flow meter art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A flow meter including means which defines therein a flow passage, drag means positioned within and arranged in a sense axially of said flow passage, said drag means constituting a drag body having an established position corresponding to a zero flow, means defining a flexure mount for said drag body including flexure elements extending into said flow passage which per se are longitudinally spaced in reference to the axis of said flow passage and under conditions of zero flow positioned normally in generally spaced parallel relation and are interconnected with said body to serve mutually as longitudinally spaced supports, said flexure elements being arranged to provide for a smooth controlled axial deflection of said body from said established position in a direct correspondence with the rate of fluid flow thereabout through said passage, and there being means having an operative relation to said drag body arranged to transmit therefrom a signal responsive and corresponding to the deflection of said drag body from said established position, which signal accurately reflects the existing rate of flow through said passage.

2. A flow meter as in claim 1 characterized by said mount being provided by flexure means which are spaced outwardly from said drag body and so connected therewith to orient said drag body in the sense of anticipated flow, and said means defining said flow passage including therein the primary and secondary windings of a differential transformer and said drag body constituting its magnetic core.

3. A flow meter as in claim 1 characterized by said drag body being elongated, a shaft mounting in connection with said body the longitudinal axis of which orients in the path of flow to and through said passage, and said flexure mount is provided by flexure elements connected to, spaced longitudinally of said shaft and, under conditions of zero flow, at substantially right angles thereto.

4. A flow meter as in claim 1 characterized by said drag means having an aerodynamic elongate shape the major extent of which is generally cylindrical and generally concentric to said flow passage and said flexure mount being provided by longitudinally spaced flexure mounts.

5. A flow meter as in claim 1 characterized by said drag means including a drag body of aerodynamic form generally concentric to the passage wall and said passage being restricted in cross-section to limit the flow of fluid about said drag body and through said passage and said flexure mount providing flexure elements at right angles to, longitudinally spaced, and interconnected to balance said drag body to provide for its essentially axial deflection substantially free of friction and adapting it to accurately signal a measure of the mass flow through said passage in any one instant in a range from about $8 \times 10^{-8}$ pounds per sec. to about $2.5 \times 10^{-4}$ pounds per sec.

6. A flow meter including means which defines therein a flow passage, drag means positioned within and arranged in a sense axially of said flow passage, said drag means constituting a drag body having an established position corresponding to a zero flow, means defining a flexure mount for said drag body causing it to assume said established position and adapting it for a smooth controlled axial deflection from said established position in a direct correspondence with the rate of fluid flow thereabout through said passage, and means having an operative relation to said drag means arranged to transmit therefrom a signal which corresponds to the deflection of said drag means from said established position, which signal accurately reflects the existing rate of flow through said passage, said drag body mounting on a shaft positioned within and in a sense concentric to said passage and said flexure mount being provided by flexure elements fixed to depend in positions spaced longitudinally of said body to respectively opposite ends of said means defining said passage and to connect to and suspend longitudinally spaced portions of said shaft.

7. A flow meter as in claim 6 characterized by said passage defining means incorporating the windings of a linear variable differential transformer and said drag body providing a magnetic core for said transformer.

8. A flow meter as set forth in claim 7 characterized by said drag body having a generally aerodynamic shape and said flexure elements mount the shaft to balance said body to reflect the rate of mass flow thereabout in a range from about $8 \times 10^{-8}$ pounds per sec. to about $2.5 \times 10^{-4}$ pounds sec.

9. A flow meter as in claim 6 characterized by cap means to either end of said means defining said flow passage including means defining a settling chamber preceding the entrance end of said flow passage, which chamber is expanded relative said flow passage, and said cap means further including means defining a restricted opening forming an entrance for introduction of fluid to said settling chamber prior to flow thereof to and through said flow passage.

10. A flow meter as in claim 9 characterized by means within said settling chamber forming a plurality of passages for establishing the flow of fluid to the entrance to said flow passage in parallel lines of flow.

11. A flow meter comprising a body including means which defines therein a restricted flow passage and includes thereabout the primary and secondary windings of a differential transformer, a drag body providing the transformer core, flexure means in connection with and suspending said drag body to position within and intermediate the ends of said flow passage, said flow passage being generally uniform in cross-section and having a smooth nozzle-like expansion to its entrance end, said body including said restricted flow passage having means in connection therewith to the entrance end of said flow passage to channel a controlled amount of fluid to pass through said passage and about said drag body, the movement of said drag body being controlled by said flexure means to occur in a generally axial sense whereby the movement of said drag body in reference to said primary and secondary windings will accurately reproduce in the form of a signal corresponding to the rate of flow in said flow passage.

12. A flow meter as in claim 11 characterized by a settling chamber formed immediately preceding the entrance to said flow passage which is relatively expanded in reference to its entrance nozzle portion and said settling chamber including therein means for transmitting fluid to said nozzle portion in originally parallel lines of flow.

13. A flow meter including a body defining a restricted flow passage of relatively short length, means defining a housing for said body including cap means to either end of said flow passage, the cap means adjacent the entrance end of said flow passage having a restricted passage for delivery to said housing and said flow passage of a limited amount of fluid, the cap means to the other end of said flow passage having a corresponding limited passage for discharge of fluid, said cap means to the entrance end of said flow passage further having a recess forming an expanded settling chamber for entering fluid adjacent the entrance end of said flow passage, said body incorporating therein the primary and secondary windings of a differential transformer about said flow passage, and an aerodynamic shaped magnetic core positioned in said flow passage concentric to said windings under conditions of zero flow, means mounting said core extending axially of said flow passage and flexure elements connected to said body and said core mounting means, at right angles thereto, to accurately balance said core and limit its movement in said flow passage under conditions of fluid flow to a generally axial sense whereby the movement of said core in response to a fluid flow through said flow passage will cause an immediate and accurate signal corresponding directly to the rate of said flow.

14. A flow meter as in claim 13 characterized by a plate-like apertured structure bridging said settling chamber in advance of said flow passage to orient the fluid moving through said chamber in essentially parallel lines of flow.

References Cited

UNITED STATES PATENTS

| | | | |
|---|---|---|---|
| 2,031,018 | 2/1936 | Thomas | 73—228 |
| 2,359,592 | 10/1944 | Stokoe | 73—228 |
| 2,707,394 | 5/1955 | Lewis | 73—228 |
| 2,826,914 | 3/1958 | Reiley | 73—228 |
| 3,103,119 | 9/1963 | Steele | 73—210 |
| 3,224,270 | 12/1965 | Karol et al. | 73—228 X |
| 3,331,248 | 7/1967 | Barker et al. | 73—205 X |
| 3,330,269 | 7/1967 | Pieper | 73—228 |
| 1,581,957 | 4/1926 | Keller | 73—228 X |

FOREIGN PATENTS

| | | |
|---|---|---|
| 178,125 | 6/1966 | U.S.S.R. |
| 426,957 | 9/1924 | Germany. |

RICHARD C. QUEISSER, *Primary Examiner.*

EDWARD D. GILHOOLY, *Assistant Examiner.*